(12) United States Patent
Ishii

(10) Patent No.: US 12,022,411 B2
(45) Date of Patent: Jun. 25, 2024

(54) COMMUNICATION APPARATUS AND COMMUNICATION SYSTEM

(71) Applicant: Sony Semiconductor Solutions Corporation, Kanagawa (JP)

(72) Inventor: Michito Ishii, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 686 days.

(21) Appl. No.: 17/269,044

(22) PCT Filed: Jul. 23, 2019

(86) PCT No.: PCT/JP2019/028776
§ 371 (c)(1),
(2) Date: Feb. 17, 2021

(87) PCT Pub. No.: WO2020/054219
PCT Pub. Date: Mar. 19, 2020

(65) Prior Publication Data
US 2021/0243707 A1 Aug. 5, 2021

(30) Foreign Application Priority Data

Sep. 13, 2018 (JP) .................................. 2018-171040

(51) Int. Cl.
*H04W 56/00* (2009.01)
*H04J 3/06* (2006.01)

(52) U.S. Cl.
CPC ......... *H04W 56/001* (2013.01); *H04J 3/0658* (2013.01)

(58) Field of Classification Search
CPC .......................... H04W 56/001; H04J 3/0658
See application file for complete search history.

(56) References Cited

U.S. PATENT DOCUMENTS

2017/0034646 A1  2/2017 Song
2017/0231508 A1  8/2017 Edwards et al.

FOREIGN PATENT DOCUMENTS

JP   2001-177570 A   6/2001
JP   2009-182659 A   8/2009
(Continued)

OTHER PUBLICATIONS

International Search Report (PCT/ISA/210), International Application No. PCT/JP2019/028776, dated Sep. 12, 2019.
(Continued)

*Primary Examiner* — Natasha W Cosme
(74) *Attorney, Agent, or Firm* — Michael Best Friedrich LLP

(57) ABSTRACT

Plural communication apparatuses connected via communication are synchronized while flexibly coping with a change in the communication state.
A clock time management section manages a clock time. A clock time measurement section measures a clock time of another clock time management section of another apparatus and a clock time of the clock time management section of this apparatus for every predetermined processing, in the course of communication with the other apparatus having the other clock time management section. A clock time difference generation section generates a clock time difference between the clock time of the other clock time management section and the clock time of the clock time management section on the basis of the measured clock times. A clock time correction instruction section instructs the other apparatus to correct the clock time of the other clock time management section on the basis of the generated clock time difference.

13 Claims, 10 Drawing Sheets

(56) References Cited

FOREIGN PATENT DOCUMENTS

| | | |
|---|---|---|
| JP | 2010-147806 A | 7/2010 |
| JP | 2011-135482 A | 7/2011 |
| JP | 2012-209791 A | 10/2012 |
| JP | 2013-106329 A | 5/2013 |
| JP | 2015-505214 A | 2/2015 |
| JP | 2015-117941 A | 6/2015 |
| JP | 2015-524215 A | 8/2015 |
| JP | 2016-116143 A | 6/2016 |
| JP | 2017-50730 A | 3/2017 |
| JP | 2017084433 A | 5/2017 |

OTHER PUBLICATIONS

Notification of Transmittal of the International Search Report and the Written Opinion of the International Searching Authority, or the Declaration (PCT/ISA/220), International Application No. PCT/JP2019/028776, dated Sep. 24, 2019.

a b a CLOCK TIME MEASUREMENT PACKET (OUTPUT INSTRUMENT A -> OUTPUT INSTRUMENT B)

b CLOCK TIME MEASUREMENT PACKET (OUTPUT INSTRUMENT B -> OUTPUT INSTRUMENT A)

c CLOCK TIME SETTING PACKET

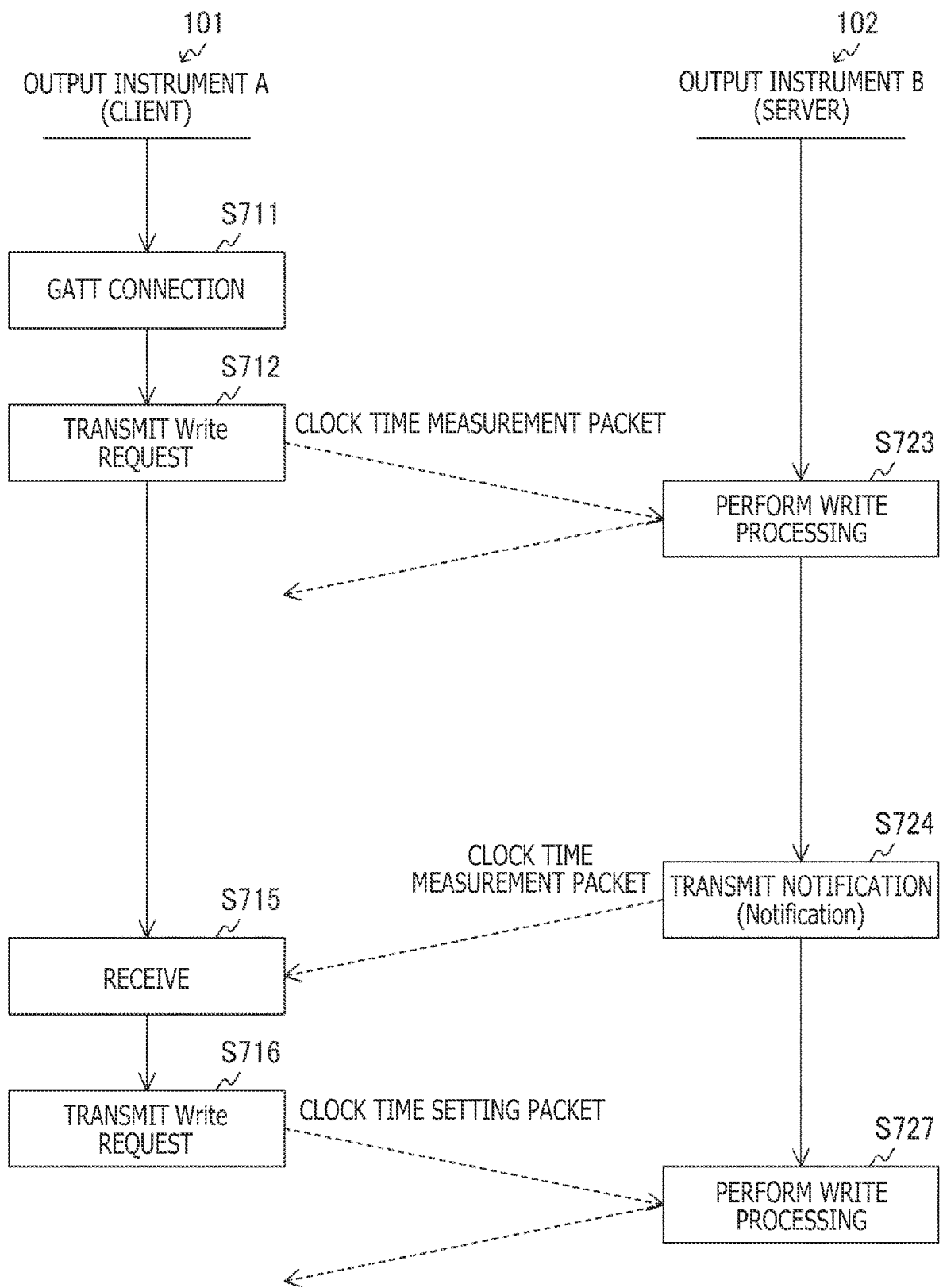

COMMUNICATION APPARATUS AND COMMUNICATION SYSTEM

TECHNICAL FIELD

The present technology relates to a communication system. More specifically, the present technology relates to a communication system in which plural communication apparatuses connected via communication are synchronized with each other and a communication apparatus in the communication system.

BACKGROUND ART

Conventionally, there is known a technology for delaying output from one of plural instruments by preset fixed time to synchronize communication between the plural instruments. For example, proposed are audio instruments set as a stereo pair in which reproduction of one audio instrument is synchronized with reproduction of the other paired audio instrument by delaying output to a power amplifier by as much as communication delay time (refer to, for example, PTL 1).

CITATION LIST

Patent Literature

PTL 1

Japanese Patent Laid-open No. 2017-084433

SUMMARY

Technical Problems

With the conventional technology described above, it is necessary to set, in advance, communication delay time from the other audio instrument in audio reproduction, as delay time. For that reason, a problem occurs that it is impossible to cope with a change in the communication state. Furthermore, a communication scheme for permitting intermittent connection is lately proposed for electricity saving, so that it is difficult to uniformly set the communication delay time.

The present technology has been achieved in light of such circumstances, and an object of the present technology is to bring plural communication apparatuses connected to each other via communication into synchronization while flexibly coping with a change in the communication state.

Solution to Problems

The present technology has been made to solve the above problems, and a first aspect of the present technology is a communication apparatus and a communication system each including a clock time management section that manages a clock time, a clock time measurement section that measures a clock time of another clock time management section of another apparatus and a clock time of the clock time management section for every predetermined processing in the course of communication with the other apparatus having the other clock time management section, a clock time difference generation section that generates a clock time difference between the clock time of the other clock time management section and the clock time of the clock time management section on the basis of the measured clock times, and a clock time correction instruction section that instructs the other apparatus to correct the clock time of the other clock time management section on the basis of the generated clock time difference. This can produce an effect of generating the clock time difference on the basis of the measured clock times, correcting the clock time of the other apparatus on the basis of the clock time difference, and bringing the apparatuses into synchronization.

Moreover, in the first aspect, the clock time measurement section may transmit and receive a clock time measurement packet that stores the clock time of the other clock time management section and the clock time of the clock time management section acquired for every predetermined processing. This can produce an effect of collecting the clock time per processing by the clock time measurement packet.

Further, in this first aspect, the clock time measurement section may perform, as the predetermined processing, measuring of a clock time at which transmission to the other apparatus is performed and clock times at which transmission and reception by the other apparatus are performed. This can produce an effect of measuring clock times at the time of transmission and reception of each apparatus.

Further, in this first aspect, the clock time measurement section may perform, as the predetermined processing, measuring of a clock time of processing that is performed before the transmission to the other apparatus is performed and a clock time of internal processing that is performed after reception by the other apparatus is performed. This can produce an effect of measuring the clock time of the internal processing performed by each apparatus.

Further, in this first aspect, the clock time correction instruction section may transmit, to the other apparatus, a clock time setting packet for setting the clock time of the other clock time management section to a designated clock time. This can produce an effect of setting the clock time of the other apparatus and bringing the apparatuses into synchronization.

Further, in this first aspect, the clock time correction instruction section may set, as delay time, time required for processing that is performed before the transmission to the other apparatus is performed, the communication with the other apparatus, and internal processing that is performed after reception by the other apparatus is performed, and may have a clock time obtained by reflecting the delay time in the clock time of the clock time management section set as the clock time of the other clock time management section. This can produce an effect of setting the clock time reflective of the delay time as the clock time of the other apparatus and bringing the apparatuses into synchronization.

Further, in this first aspect, the communication apparatus may further include an output section that performs predetermined output according to the clock time of the clock time management section. This can produce an effect of bringing synchronization in the output from the apparatuses.

Further, in this first aspect, the communication may be held by a communication scheme that permits intermittent connection. Collecting the clock time per processing makes it possible to cope with intermittent connection. For example, the communication may be held in compliance with a wireless communication standard Bluetooth (registered trademark) Low Energy (hereinafter referred to as "BLE"), the clock time measurement section may transmit and receive a packet for measuring the clock time of the other clock time management section and the clock time of the clock time management section by GATT (Generic ATTribute profile) connection, and the clock time correction instruction section may transmit a packet for giving an instruction on correction of the clock time of the other clock time management section by the GATT connection.

Furthermore, a second aspect of the present technology is a communication apparatus and a communication system each including a clock time management section that manages a clock time, a clock time measurement section that measures a clock time of another clock time management section of another apparatus and a clock time of the clock time management section for every predetermined processing in the course of communication with the other apparatus having the other clock time management section, a clock time difference generation section that generates a clock time difference between the clock time of the other clock time management section and the clock time of the clock time management section on the basis of the measured clock times, and a clock time correction section that corrects the clock time of the clock time management section on the basis of the generated clock time difference. This can produce an effect of generating the clock time difference on the basis of the measured clock times, correcting the clock times of the apparatus on the basis of the clock time difference, and bringing the apparatuses into synchronization.

BRIEF DESCRIPTION OF DRAWINGS

FIG. 10 is a sequence diagram depicting an example of a flow of processing in an example of applying the embodiment of the present technology to the BLE.

DESCRIPTION OF EMBODIMENT

A mode for carrying out the present technology (hereinafter, referred to as an "embodiment") will hereinafter be described. Description is given in the following order.

1. Embodiment

2. Example of Application

1. Embodiment

[Communication System]

Figure 1:
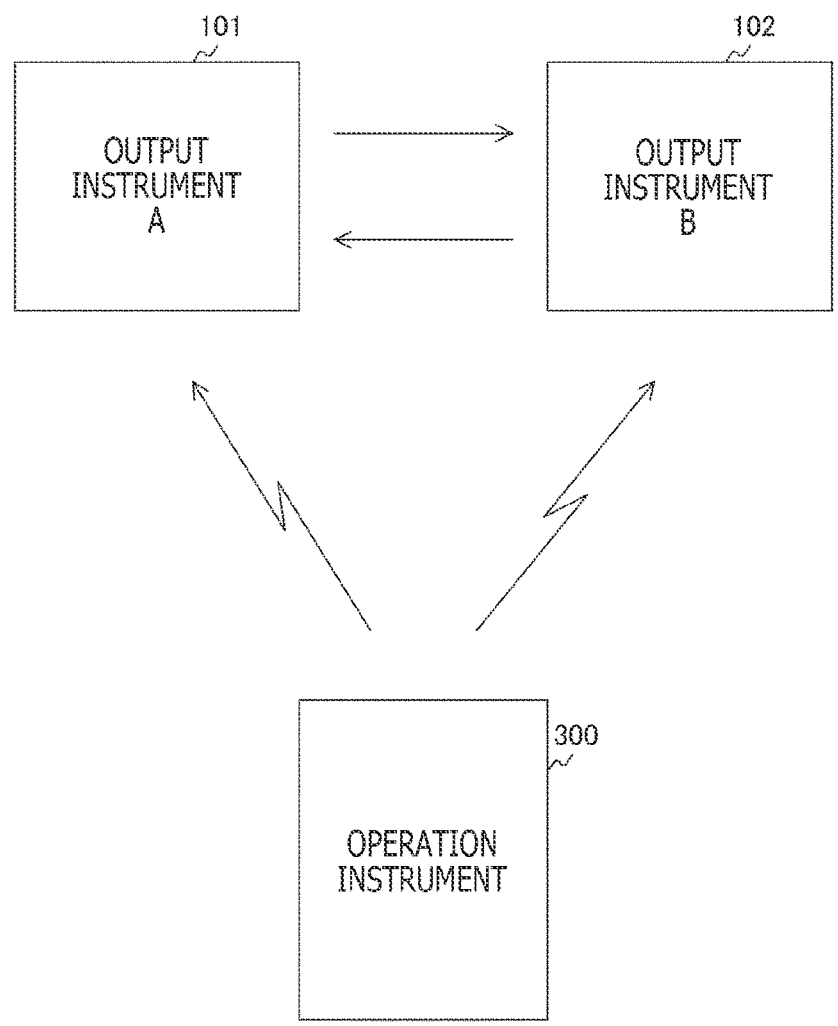
FIG. 1 is a diagram depicting an example of overall configurations of a communication system according to an embodiment of the present technology.

FIG. 1 is a diagram depicting an example of overall configurations of a communication system according to an embodiment of the present technology. FIG. 1 depicts two output instruments A (101) and B (102) and an operation instrument 300.

The output instruments A (101) and B (102) are instruments each of which outputs data according to an operation performed from the operation instrument 300. For example, audio instruments such as headphones and speakers are assumed as the output instruments A (101) and B (102). In this case, the output instrument A (101) reproduces and outputs audio in a left channel, and the output instrument B (102) reproduces and outputs audio in a right channel. It is noted that the output instruments A (101) and B (102) are sometimes collectively referred to as "output instruments 101 and 102."

The operation instrument 300 is an instrument for performing operations on the output instruments 101 and 102. The operation instrument 300 transmits signals (operation signals and audio signals) to the output instruments 101 and 102 by wireless communication. Further, the output instrument A (101) and the output instrument B (102) exchange data similarly by wireless communication. For example, wireless communication using a BLE standard is assumed as the wireless communication. It is noted that an example of application of the present technology to the BLE standard will separately be described below.

The operation instrument 300 transmits audio signals in the left and right channels to the respective output instruments 101 and 102. The output instruments 101 and 102 reproduce the audio signals in the left and right channels, respectively. The output instruments 101 and 102 include their own clocks and reproduce the audio signals according to their respective clocks. Therefore, any lag between the clocks of the output instruments 101 and 102 generates misalignment in reproduction and output and gives a listener an acoustically strange feeling. In this embodiment, the output instrument A (101) and the output instrument B (102) perform reproduction and output while reducing misalignment in a time base direction by bringing the output instruments A (101) and B (102) into clock synchronization.

[Output Instruments]

Figure 2:
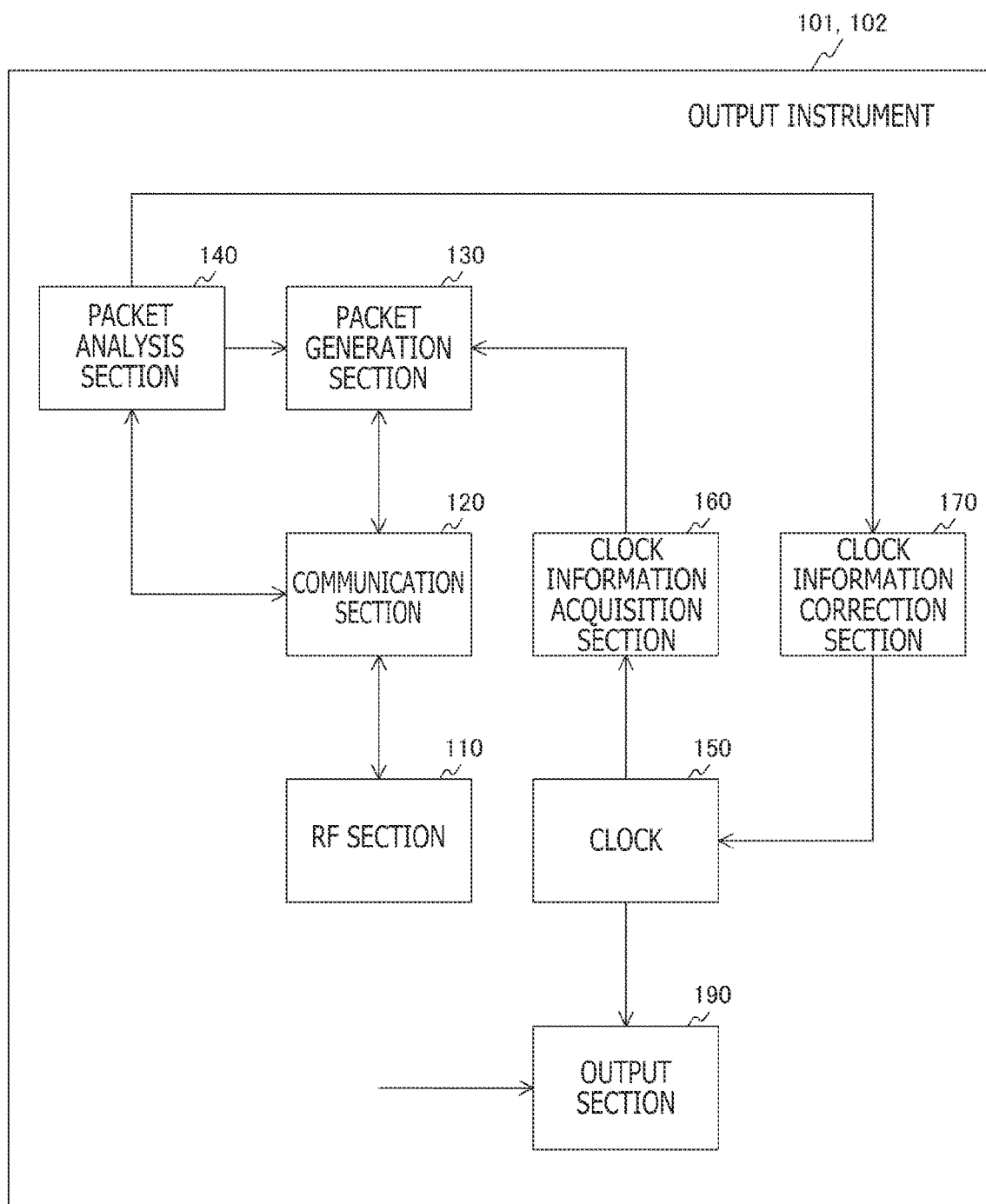
FIG. 2 is a diagram depicting an example of configurations of output instruments 101 and 102 according to the embodiment of the present technology.

FIG. 2 is a diagram depicting an example of configurations of the output instruments 101 and 102 according to the embodiment of the present technology.

It is supposed that the output instruments 101 and 102 are instruments identical in configurations. Therefore, the output instruments 101 and 102 are modeled on the assumption that the output instruments 101 and 102 are identical in processing time required for transmission and reception of a packet. It is also assumed that transmission time between the output instrument A (101) and the output instrument B (102) is identical between upstream and downstream (outward and return paths) on condition that the packet length is the same. It is to be noted that, while the clock synchronization between the instruments typically refers to the clock synchronization in frequency components and that in phase components, the phase components will be discussed here.

Each of the output instruments 101 and 102 includes an RF section 110, a communication section 120, a packet generation section 130, a packet analysis section 140, a clock 150, a clock information acquisition section 160, a clock information correction section 170, and an output section 190.

The RF (Radio Frequency) section 110 is a circuit that handles radio frequencies in the wireless communication. The RF section 110 demodulates a received signal to generate a baseband signal or modulates a baseband signal, and transmits the resultant signal.

The communication section 120 holds communication by a protocol compliant with a communication scheme. The communication section 120 holds communication, for example, by GATT connection by procedures specified in the BLE standard.

The packet generation section 130 is a section that generates a packet for holding wireless communication. The packet generation section 130 generates, for example, a GATT packet specified in the BLE standard. It is noted that the packet generation section 130 is an example of a clock time correction instruction section set forth in the claims.

The packet analysis section 140 is a section that analyzes a received packet and performs necessary processing. The packet analysis section 140 extracts, for example, specific fields in the GATT packet specified in the BLE standard. Further, as described later, the packet analysis section 140 generates a clock time difference on the basis of a clock time stored in a packet received from outside. It is noted that the packet analysis section 140 is an example of a clock time difference generation section set forth in the claims.

The clock 150 is a circuit that generates a periodic signal. Each section in the output instruments 101 and 102 operates synchronously with the periodic signal generated by the clock 150. This periodic signal itself or one in a time scale of this periodic signal is hereinafter used as a clock time. In other words, the clock 150 is an example of a clock time management section that manages a clock time, set forth in the claims.

The clock information acquisition section 160 is a section that acquires a value of the clock 150 and supplies the value to the packet generation section 130. The packet generation section 130 stores the value of the clock 150 in a packet as a clock time, as described later. It is noted that the clock information acquisition section 160 is an example of a clock time measurement section set forth in the claims.

The clock information correction section 170 is a section that corrects the value of the clock 150. The clock information correction section 170 corrects the value of the clock 150 by the clock time difference generated by the packet analysis section 140. It is noted that the clock information correction section 170 is an example of a clock information correction section set forth in the claims.

The output section 190 is a section that reproduces and outputs the supplied audio signal in synchronization with the value of the clock 150. If the clocks 150 of the output instruments 101 and 102 are accurately synchronized, the output sections 190 are capable of reproducing and outputting the audio signals without generating misalignment.

Figure 3:
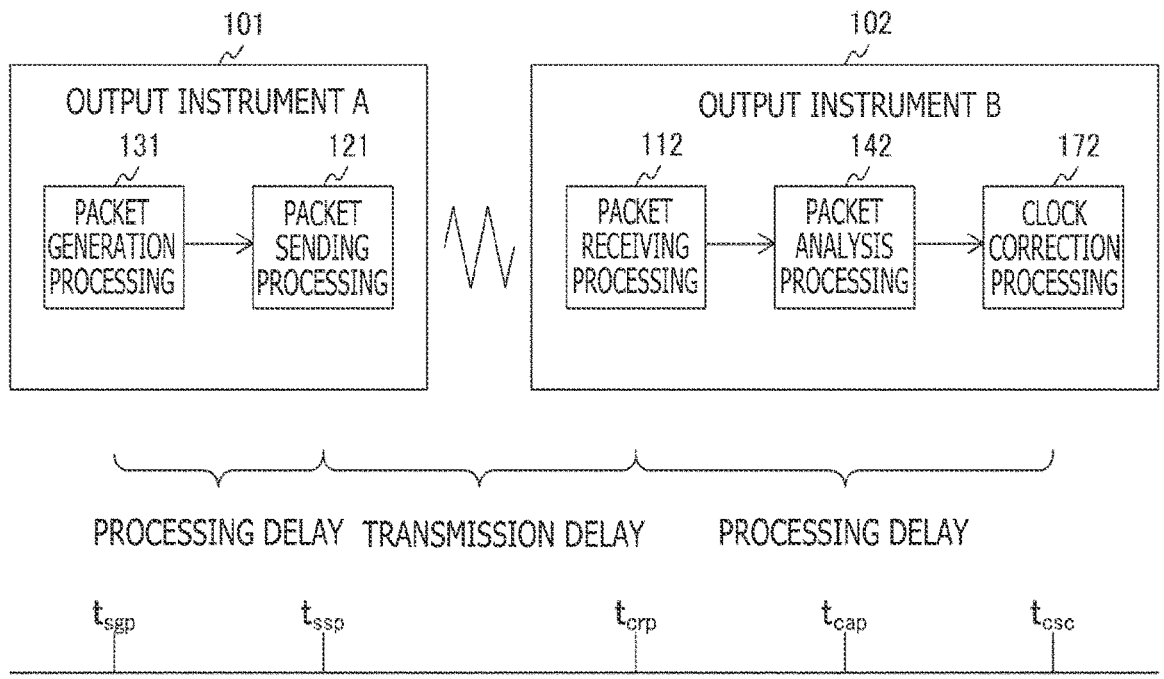
FIG. 3 illustrates diagrams depicting an example of contents of processing by the output instruments 101 and 102 according to the embodiment of the present technology.
Figure 3:
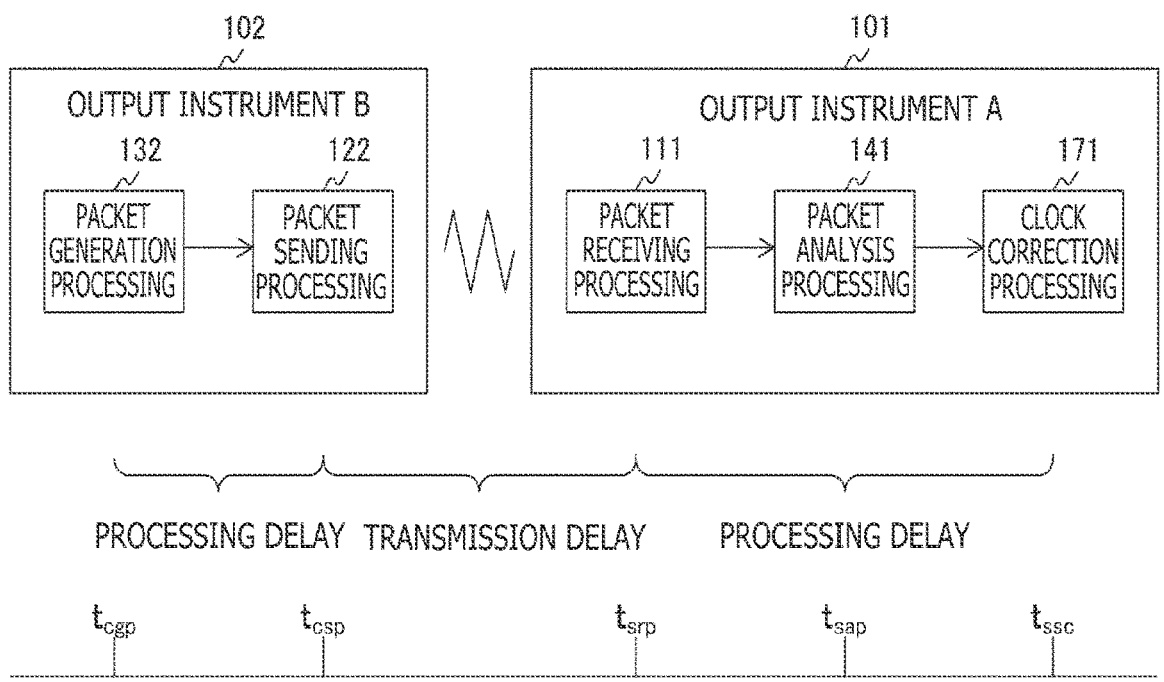

FIG. 3 illustrates diagrams depicting an example of contents of processing by the output instruments 101 and 102 according to the embodiment of the present technology.

In FIG. 3, a depicts contents of processing in a case of transmitting a packet from the output instrument A (101) to the output instrument B (102). The output instrument A (101) performs packet generation processing 131 and performs generated packet sending processing 121. It is assumed here that a clock time at which a packet is generated by the packet generation processing 131 is $t_{sgp}$, and that a clock time at which the packet is sent by the packet sending processing 121 is $t_{ssp}$. In other words, a processing delay of the output instrument A (101) required in the processes from the packet generation to the packet sending is calculated as "$t_{ssp}-t_{sgp}$."

The output instrument B (102) performs packet receiving processing 112 on the packet from the output instrument A (101) and performs received packet analysis processing 142. The output instrument B (102) then performs correction processing 172 on the value of the clock 150 as needed. It is assumed here that a clock time at which the packet is received by the packet receiving processing 112 is $t_{crp}$ and that a clock time at which the packet is analyzed and a value for correction is generated by the packet analysis processing 142 is $t_{cap}$. It is also assumed that a clock time at which the value of the clock 150 is set by the clock correction processing 172 is $t_{csc}$. In other words, a transmission delay required in the processes from the sending of the packet by the output instrument A (101) to the receiving of the packet by the output instrument B (102) is calculated as "$t_{crp}-t_{ssp}$." Furthermore, a processing delay of the output instrument B (102) required in the processes from the receiving of the packet to the setting of the value of the clock 150 is calculated as "$t_{scs}-t_{crp}$."

In FIG. 3, b depicts contents of processing in a case of transmitting a packet from the output instrument B (102) to the output instrument A (101). The output instrument B (102) performs packet generation processing 132 and performs generated packet sending processing 122. It is assumed here that a clock time at which the packet is generated by the packet generation processing 132 is $t_{cgp}$ and that a clock time at which the packet is sent by the packet sending processing 122 is $t_{cap}$. In other words, a processing delay of the output instrument B (102) required in the processes from the packet generation to the packet sending is calculated as "$t_{csp}-t_{cgp}$."

The output instrument A (101) performs packet receiving processing 111 on the packet from the output instrument B (102) and performs received packet analysis processing 141. The output instrument A (101) then performs correction processing 171 on the value of the clock 150 as needed. It is assumed here that a clock time at which the packet is received by the packet receiving processing 111 is $t_{srp}$ and that a clock time at which the packet is analyzed and a value for correction is generated by the packet analysis processing 141 is $t_{sap}$. It is also assumed that a clock time at which the value of the clock 150 is set by the clock correction processing 171 is $t_{asc}$. In other words, a transmission delay required in the processes from sending of the packet by the output instrument B (102) to the receiving of the packet by the output instrument A (101) is calculated as "$t_{srp}-t_{csp}$." In addition, a processing delay of the output instrument A (101) required in the processes from the receiving of the packet to the setting of the value of the clock 150 is calculated as "$t_{ssc}-t_{srp}$."

As described above, the output instruments A (101) and B (102) are identical in configurations, and it is supposed that the corresponding processing delays are equal. It is also supposed that the transmission delays are equal. In other words, the following relations are established.

$$t_{ssp}-t_{sgp}=t_{csp}-t_{cgp}$$

$$t_{crp}-t_{ssp}=t_{srp}-t_{csp}$$

$$t_{csc}-t_{crp}=t_{ssc}-t_{srp}$$

It is noted that, even in a case of extension of the transmission delay for a communication failure of some sort, the above relations are established when the extension is approximately the same between transmitting and receiving sides.

[Packet configurations]

Figure 4:
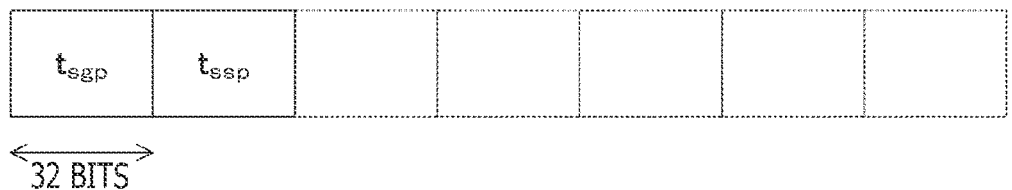
FIG. 4 illustrates diagrams depicting an example of field configurations of a clock time measurement packet and a clock time setting packet according to the embodiment of the present technology.
Figure 4:
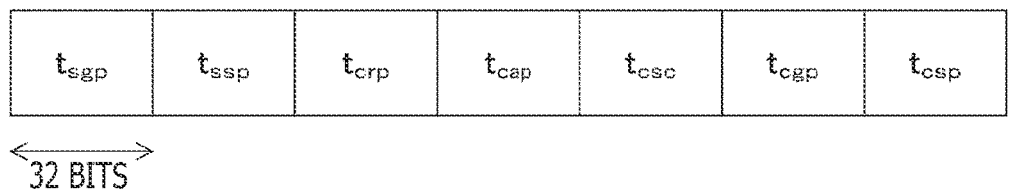
Figure 4:
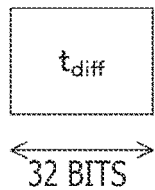

FIG. 4 illustrates diagrams depicting an example of field configurations of a clock time measurement packet and a clock time setting packet according to the embodiment of the present technology.

The output instrument A (101) transmits the clock time measurement packet to the output instrument B (102), to generate the clock time difference between the clock 150 of the output instrument A (101) and the clock 150 of the output instrument B (102). This clock time measurement packet is a packet that stores the value of the clock 150 of the output instrument 101 or 102 per processing as a time stamp (clock time) in the course of communication between the output instruments 101 and 102. It is noted that the clock time measurement packet stores each clock time as 32-bit data in this example.

In FIG. 4, a depicts a state of the clock time measurement packet when the clock time measurement packet is transmitted from the output instrument A (101) to the output instrument B (102). The output instrument A (101) stores the clock time $t_{sgp}$, at which the packet is generated and the clock time $t_{ssp}$ at which the packet is sent, in the clock time measurement packet, and transmits the clock time measurement packet to the output instrument B (102).

The clock time measurement packet is then received by the output instrument B (102), and each clock time of processing is stored in the clock time measurement packet in association with a progress of a series of processing. This clock time measurement packet is then transmitted to the output instrument A (101).

In FIG. 4, b depicts a state of the clock time measurement packet when the clock time measurement packet is transmitted from the output instrument B (102) to the output instrument A (101). The output instrument B (102) stores the clock time $t_{crp}$ at which the packet is received, the clock time $t_{cap}$ at which the packet is analyzed, the clock time $t_{csc}$ at which the value of the clock 150 is set, the clock time $t_{cgp}$ at which the packet is generated, and the clock time $t_{csp}$ at which the packet is sent, in the clock time measurement packet, and transmits the clock time measurement packet to the output instrument A (101).

The output instrument A (101) then analyzes the clock time measurement packet, and generates a set value $t_{diff}$ on the basis of the clock time difference between the clock 150 of the output instrument A (101) and the clock 150 of the output instrument B (102).

In FIG. 4, c depicts a state of the clock time setting packet when the clock time setting packet is transmitted from the output instrument A (101) to the output instrument B (102). This clock time setting packet is a packet that gives an instruction on the value $t_{diff}$ to be set for the clock 150 of the output instrument B (102). It is noted that the clock time setting packet stores the value $t_{diff}$ as 32-bit data in this example.

Upon receiving this clock time setting packet, the output instrument B (102) sets the set value $t_{ditt}$ stored in the clock time setting packet for the clock 150. This brings the clocks 150 of the output instrument A (101) in synchronization with the clock 15 of the output instrument B (102).

[Operations]

Figure 5:
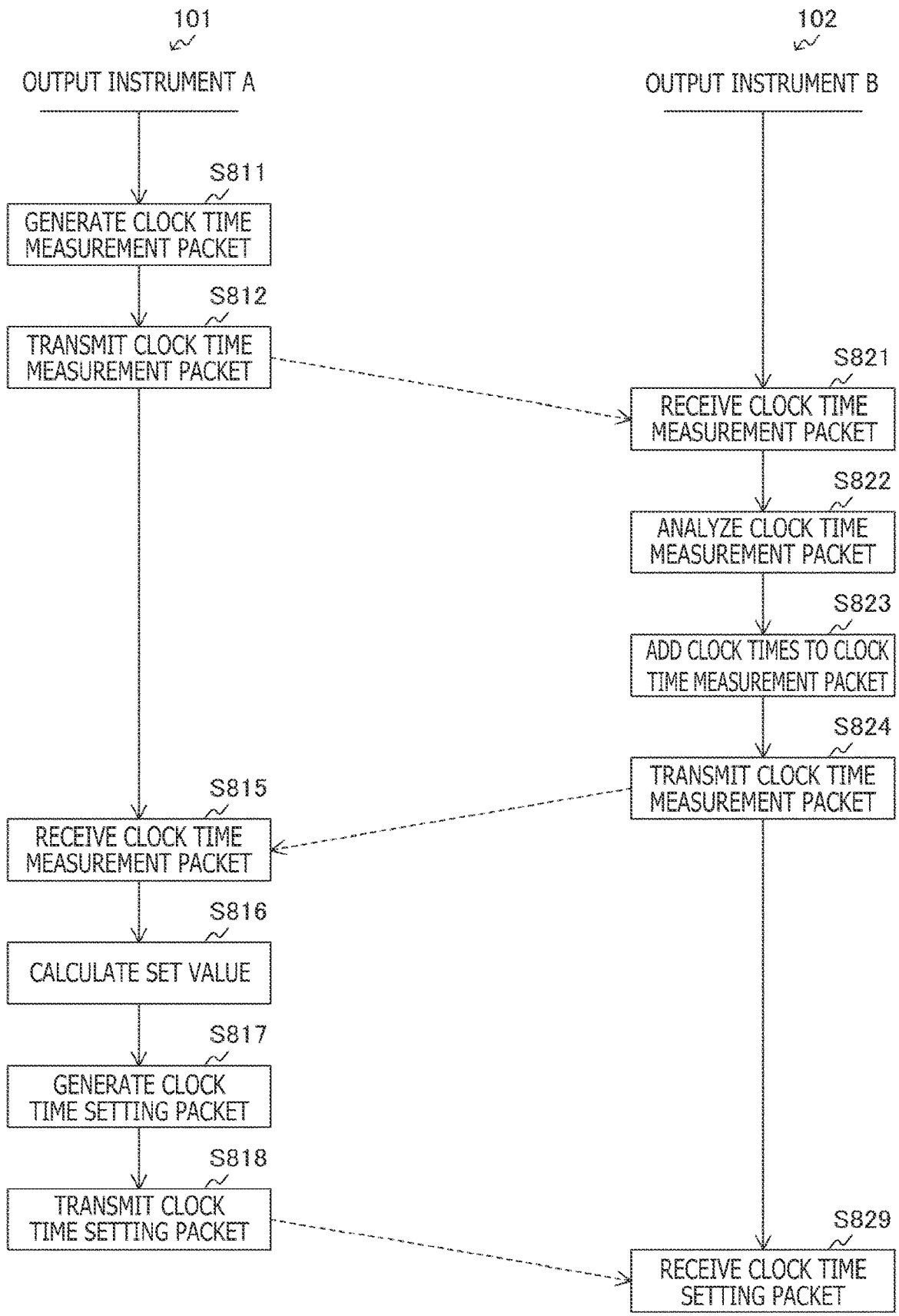
FIG. 5 is a sequence diagram depicting an example of a flow of processing between an output instrument A (101) and an output instrument B (102) according to the embodiment of the present technology.

FIG. 5 is a sequence diagram depicting an example of a flow of processing between the output instrument A (101) and the output instrument B (102) according to the embodiment of the present technology.

The output instrument A (101) generates the clock time measurement packet (Step S811) and transmits the clock time measurement packet to the output instrument B (102) (Step S812).

The output instrument B (102) receives the clock time measurement packet (Step 3821) and measures a receipt clock time. After analyzing the clock time measurement packet (Step S822), the output instrument B (102) adds the receipt clock time to the clock time measurement packet and adds a transmission clock time to the clock time measurement packet immediately before transmission (Step S823), and transmits the clock time measurement packet to the output instrument A (101) (Step S824).

The output instrument A (101) receives the clock time measurement packet returned from the output instrument B (102) (Step S815) and analyzes the clock time measurement packet. In other words, the clock time measurement packet is made to reciprocate while recording therein an acquirable time stamp at each processing point in time, and all pieces of information are aggregated in the output instrument A (101).

The output instrument A (101) thereby calculates processing delay time of each of the output instruments A (101) and B (102) and transmission delay time between the output instruments A (101) and B (102) and calculates the set value of the clock 150 of the output instrument B (102) (Step S816). The output instrument A (101) generates the clock time setting packet that stores therein the calculated set value (Step S817) and transmits the clock time setting packet to the output instrument B (102) (Step S818).

The output instrument B (102) receives the clock time setting packet (Step S829) and sets the stored set value for the clock 150.

Specific Example

Figure 6:
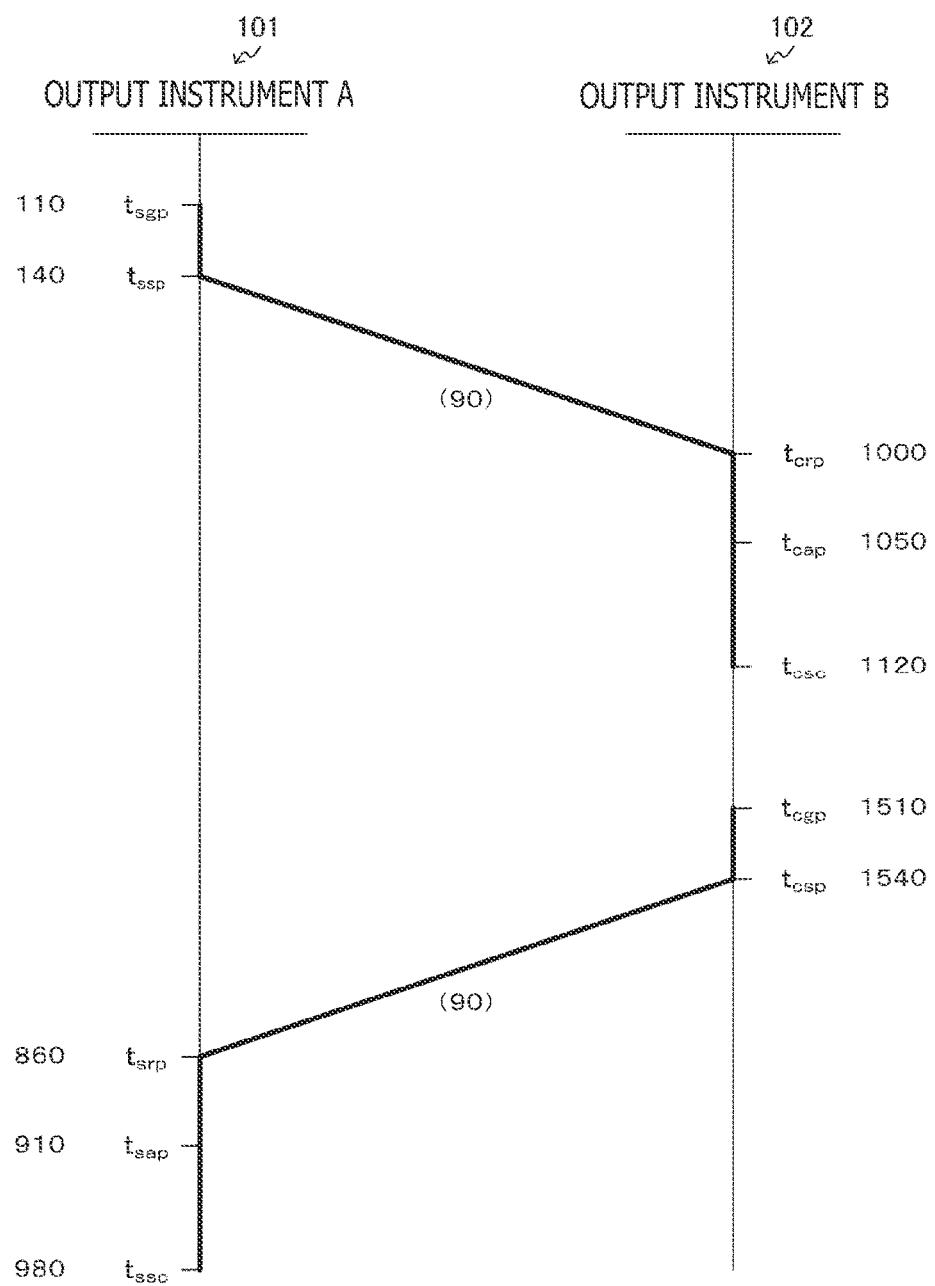
FIG. 6 is a diagram depicting a specific example of clock times in the output instrument A (101) and the output instrument B (102) according to the embodiment of the present technology.

FIG. 6 is a diagram depicting a specific example of clock times in the output instrument A (101) and the output instrument B (102) according to the embodiment of the present technology. As described above, in this embodiment, by making the clock time measurement packet reciprocate, the time stamps at the processing points in time that can be acquired by each of the output instruments A (101) and B (102) are recorded.

It is assumed in this example that the clock time $t_{sgp}$ at which the output instrument A (101) generates the clock time measurement packet is "110" and that the clock time $t_{ssp}$ at which the output instrument A (101) sends the clock time measurement packet is "140." The output instrument A (101) transmits the clock time measurement packet storing therein these two clock times $t_{sgp}$ and $t_{ssp}$, to the output instrument B (102).

The output instrument B (102) receives the clock time measurement packet transmitted from the output instrument A (101). At this point in time, the output instrument B (102) operates on the basis of clock times different from those of the output instrument A (101). It is assumed in this example that the clock time $t_{crp}$ at which the output instrument B (102) receives the clock time measurement packet is "1000." It is also assumed that the clock time $t_{cap}$ at which the output instrument B (102) analyzes the clock time measurement packet is "1050" and that the clock time $t_{csc}$ at which the output instrument B (102) sets the value of the clock 150 is "1120."

Inverse processing is then started. At this time, it is assumed that the clock $t_{cgp}$ at which the output instrument B (102) generates the clock time measurement is "1510" and that the clock time $t_{csp}$ at which the output instrument B (102) sends the clock time measurement is "1540." The seven clock times so far are stored in the clock time measurement packet returned from the output instrument B (102) to the output instrument A (101).

The output instrument A (101) receives the clock time measurement packet returned from the output instrument B (102). It is assumed in this example that the clock time $t_{srp}$ at which the output instrument A (101) receives the clock time measurement packet is "860." It is also assumed that the clock time $t_{sap}$ at which the output instrument A (101) analyzes the clock time measurement packet is "910" and that the clock time $t_{ssc}$ at which the output instrument A (101) goes through a routine of setting the value of the clock 150 is "980."

It can be understood from these specific examples that a processing delay in the processes from packet generation to transmission is "30" and that a processing delay in the processes from packet reception to clock setting is "120." It is noted that this proximity can guarantee that the output instrument A (101) and the output instrument B (102) can be calculated by the same model.

Since the clock time at which the output instrument A (101) transmits the clock time measurement packet is "140" and the clock time at which the output instrument A (101) subsequently receives the returned clock time measurement packet is "860," it can be understood that "720" is elapsed between these clock times. Further, since contents of the clock time measurement packet indicate that the clock time at which the output instrument B (102) receives the clock time measurement packet is "1000" and the clock time at which the output instrument B (102) returns the clock time measurement packet is "1540," it can be understood that the time required for the output instrument B (102) is "540." Therefore, a value obtained by subtracting "540" from "720" and dividing a subtraction result by "2" is a one-way transmission delay. In other words, it is possible to obtain the value as follows.

(One-way transmission delay)=((860−140)−(1540−1000))/2=90.

Moreover, a delay in the processes from the generation of the clock time measurement packet by the output instrument A (101) to the clock setting by the output instrument B (102) can be obtained as follows.

(Processing delay+transmission delay)=(140−110)+90+(1120−1000)=240

Therefore, to synchronize the clock of the output instrument B (102) with that of the output instrument A (101), a value obtained by adding "240" to the clock of the output instrument A (101) is stored in the clock time setting packet, and the clock time setting packet is transmitted to the output instrument B (102). This can bring the clock of the output instrument A (101) into synchronization with the clock of the output instrument B (102) at a point in time at which the time "240" is elapsed.

[Modification]

While the clock time setting packet is transmitted so that the clock of the output instrument B (102) is synchronized with that of the output instrument A (101) in the above embodiment, conversely, the clock of the output instrument A (101) may be synchronized with that of the output instrument B (102). In that case, it is unnecessary to transmit the clock time setting packet, and the output instrument A (101) sets the clock time of the clock.

Specifically, the output instrument A (101) is only required to set, as a new value of the clock, a value obtained by adding the (processing delay+transmission delay) described above to the clock time at which the output instrument B (102) generates the clock time measurement packet. In other words, at the clock time $t_{ssc}$ (980) at which the value of the clock 150 of the output instrument A (101) is set, the new value of the clock 150 is set as follows.

1510+240=1750

2. Example of Application

As an example of application of the embodiment described above, an example of a case of applying the embodiment to the BLE will next be described.

[Communication Procedures]

Figure 7:
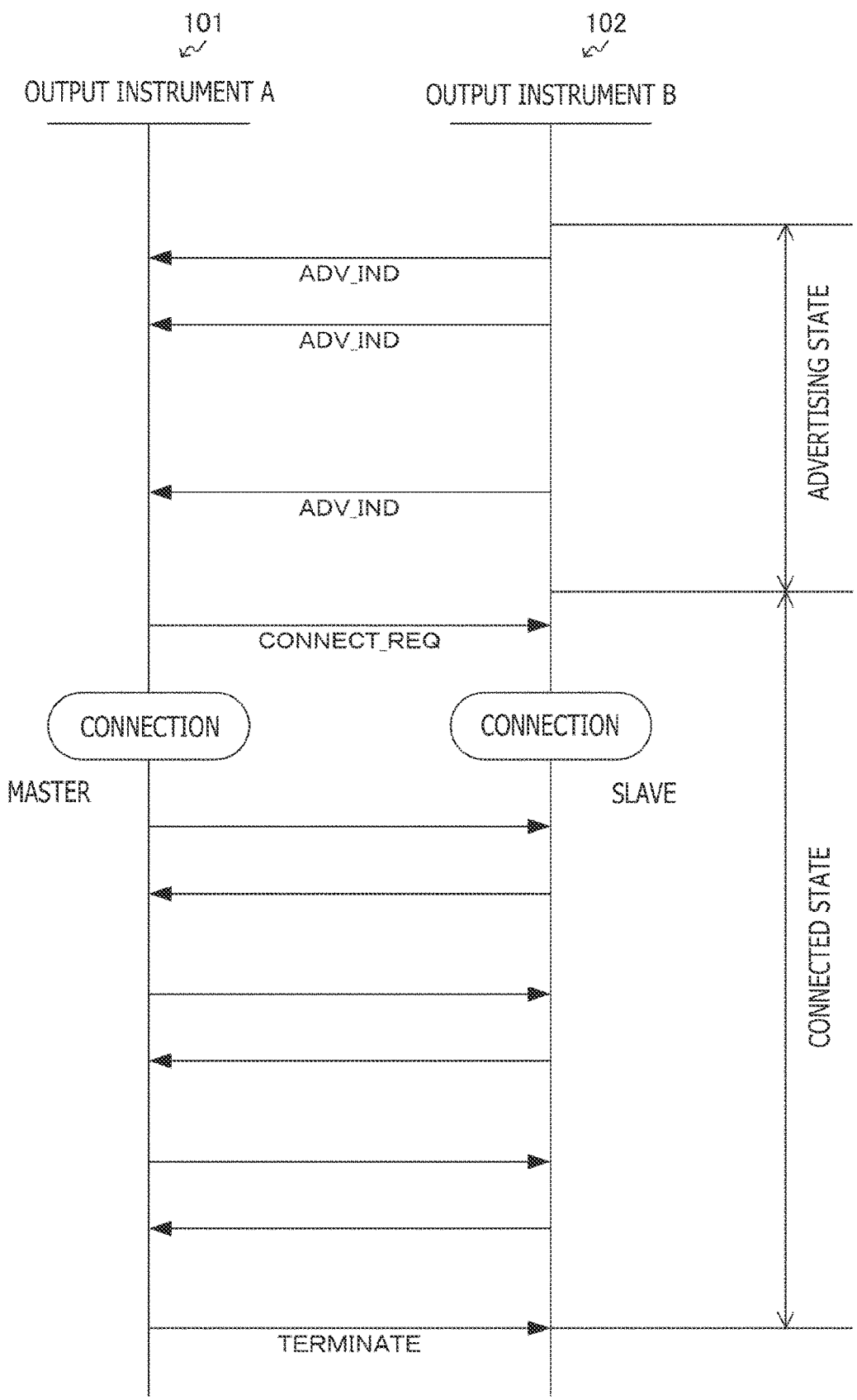
FIG. 7 is a diagram depicting communication procedures compliant with BLE.

FIG. 7 is a diagram depicting communication procedures compliant with the BLE.

As communication held in a physical channel under the BLE standard, advertising (Advertising) communication for broadcasting and connection (Connection) communication between two instruments held in a state in which connection to a specific instrument is established are present.

The advertising communication is transmission of data using advertising channels. The advertising communication is started when one instrument (advertiser) transmits advertising packets by using the advertising channels. The other instrument (scanner) circulates around the advertising channels and receives the advertising packets.

The connection communication is communication held between a master and a slave to transmit and receive data therebetween. While the connection communication is started when the master transmits packets (frames) via a data channel, the master and the slave subsequently transmit data alternately.

In this example, the output instrument B (102) is the advertiser and transmits advertising packets (ADV_IND: Advertising Indication), always at predetermined intervals, to receive a GATT connection request. Further, the output instrument A (101) is the scanner and returns a communication request packet (CONNECT_REQ: Connection Request) to request GATT connection by using the advertising channels. The connection is thereby started. It is noted that a state until the connection is started is called an "advertising state," and one-way communication by a GAP (Generic Access Profile) is held in the advertising state.

A state after the connection is established is called a "connected state," and two-way communication by GATT connection is held in the connected state. In the GATT connection, the output instrument A (101) serves as a master, and the output instrument B (102) serves as a slave. A frame (TERMINATE) for leaving the connected state can be transmitted from both the master and the slave.

It is supposed in this example of application that the clock time measurement packet and the clock time setting packet described above are transmitted using the GATT connection.

While it is supposed in the above example that the output instrument A (101) serves as the master and the output instrument B (102) serves as the slave, the master can be determined freely. For example, the master may be determined by a negotiation in advance. Alternatively, as product specifications, either the output instrument in the right channel or the output instrument in the left channel may be preferentially set as the master. In another alternative, the instrument that issues a connection request first may be determined as the master.

(Protocol Stack)

Figure 8:
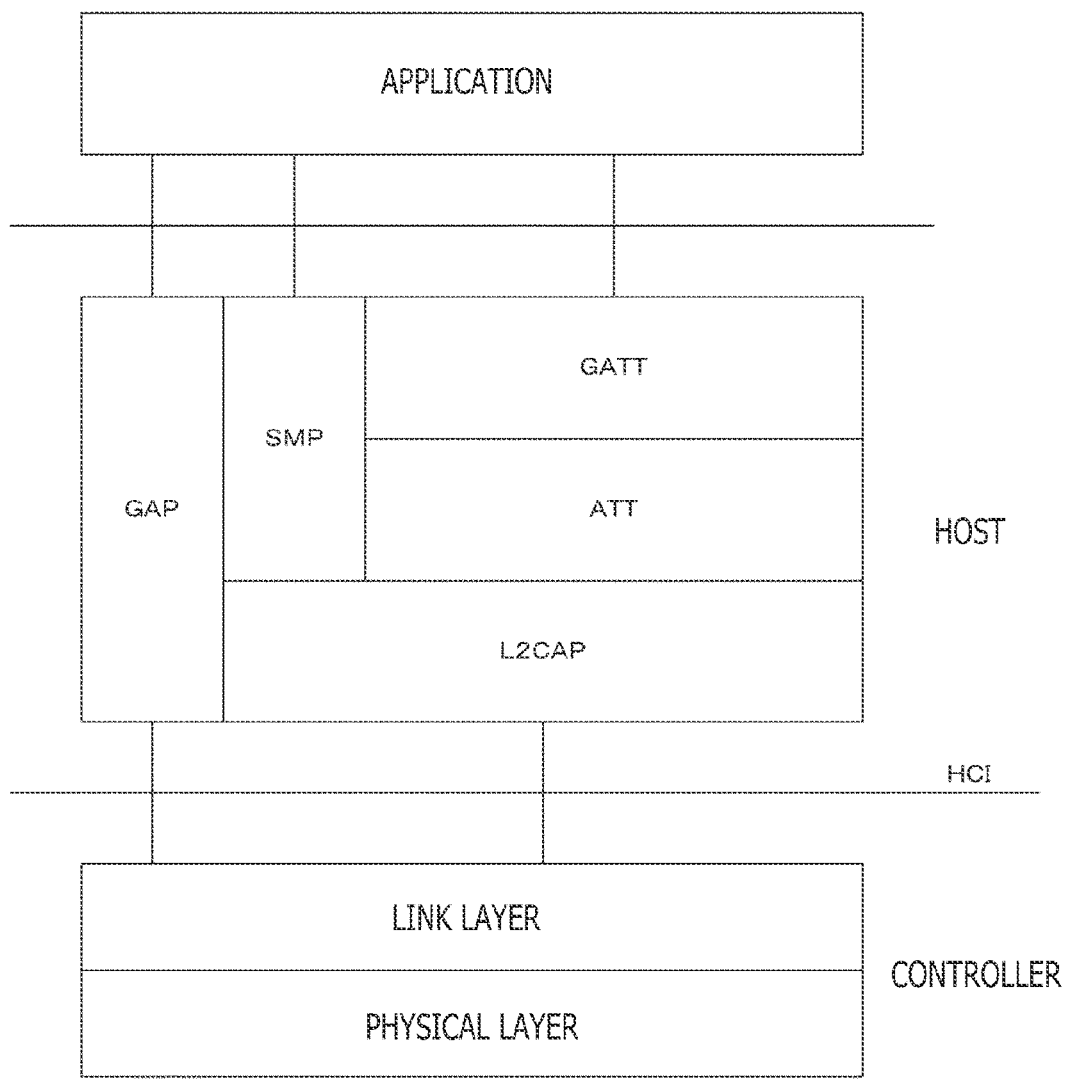
FIG. 8 is a diagram depicting a protocol stack compliant with the BLE.

FIG. 8 is a diagram depicting a protocol stack compliant with the BLE.

Under the BLE, the GATT is for performing data structuring using an ATT (ATTribute profile). In addition, the GATT is for performing exchange with an application. In the GATT connection, information delivery can be performed by a GATT characteristic. In the GATT, the characteristic is provided to each of one or more services on a server. Necessary processing is performed by writing or reading a value of the characteristic from a client. As the characteristic in a GATT profile, use of a uniquely defined characteristic is assumed to be allowed.

An SMP (Security Manager Protocol) is a protocol for managing security between the instruments. An L2CAP (Logical Link Control and Adaptation Protocol) is a protocol that specifies logical channels between the instruments. The GAP is a protocol that controls the advertising and the connection described above.

An HCI (Host Controller Interface) is an interface between the host and the controller. The controller is divided into a physical layer for holding physical communication and a link layer for controlling the physical layer.

[Packet]

Figure 9:
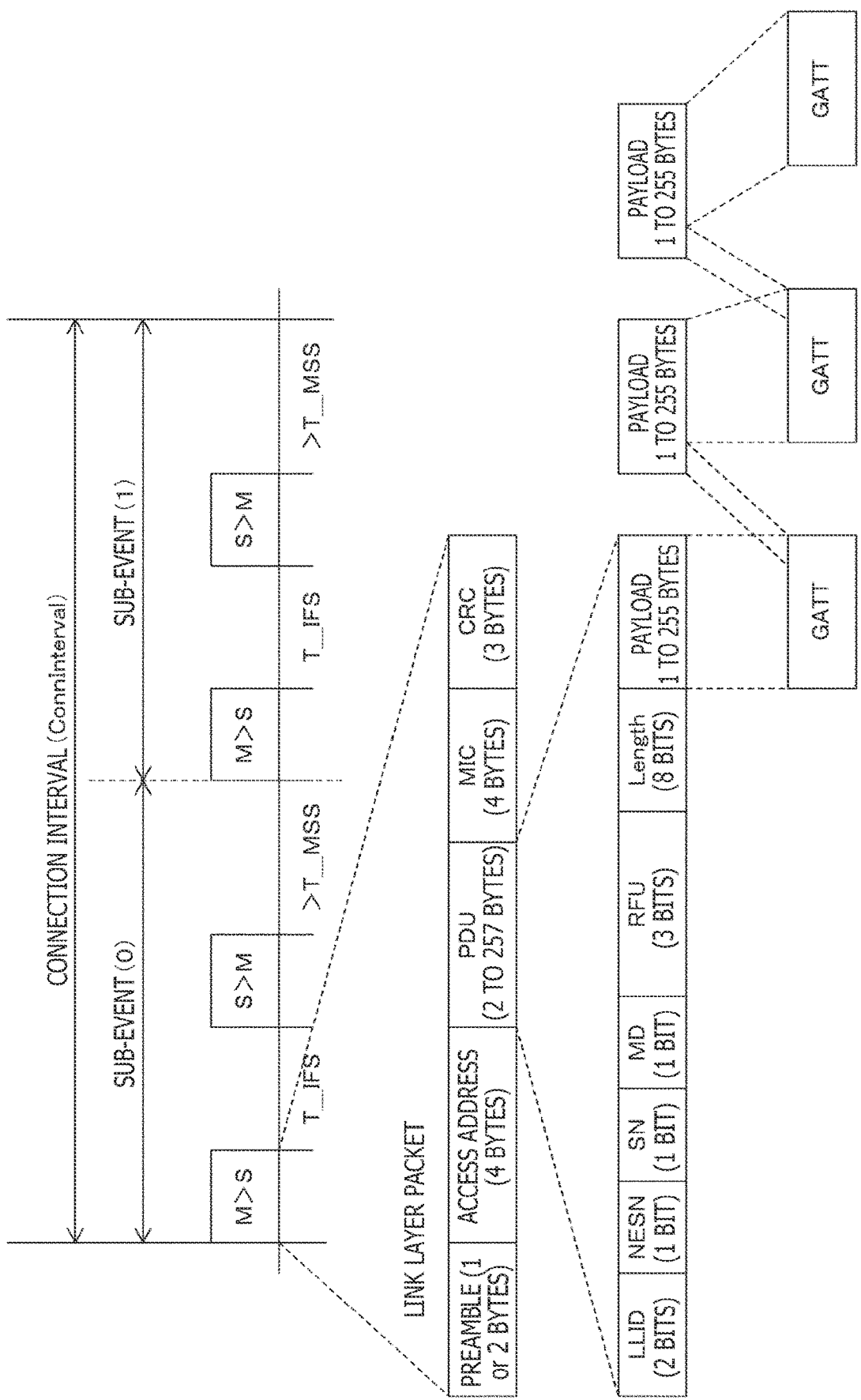
FIG. 9 is a diagram depicting a packet structure on a link layer compliant with the BLE.

FIG. 9 is a diagram depicting a packet structure on the link layer compliant with the BLE. Since it is supposed that asynchronous communication is held in the GATT connection in this embodiment, an asynchronous packet is depicted.

Under the BLE, connection is established intermittently. A transmission interval is defined as a connInterval value in the standard and values of 1.25 ms are set in the range from 7.5 ms to 4.0 s.

The connInterval is divided into plural sub-events, and master-to-slave communication and slave-to-master communication are held in one sub-event. A time period between the master-to-slave communication and the slave-to-master communication is defined by a T_IFS value in the standard. Furthermore, it is necessary to allocate a longer time period than a T_MSS value in the standard, as a time period between the slave-to-master communication and an end of each sub-event.

A link layer packet for use in the master-to-slave communication includes a preamble of one or two bytes, an access address of four bytes, a PDU of two to 257 bytes, an MIC of four bytes, and a CRC of three bytes. The preamble is a bit sequence used for a receiving side to detect timing in units of bits. The access address is an address of a destination to be accessed. Under the BLE, a random value is assigned to this access address per connection between the instruments. The PDU (Protocol Data Unit) is data transmitted by this packet. The MIC (Message Integrity Check) is a code for checking a degree of adequacy of PDU encryption. The CRC (Cyclic Redundancy Check) is a cyclic test code for PDU error detection.

The PDU includes an LLID of two bits, an NESN of one bit, an SN of one bit, an MD of one bit, an RFU of three bits, a Length of eight bits, and a payload of one to 255 bytes. The LLID (Logical Link ID) is an identifier indicating a type (for data/for control) of the packet. The NESN (Next Expected Sequence Number) is a next expected sequence number. The SN (Sequence Number) is a sequence number of this packet. The MD (More Data) is a flag indicating whether or not subsequent data is present. The RFU (Reserved for Future Use) is a reserve field. The Length is information indicating a length of a sum of the payload and the MIC in bytes. The payload is data transmitted by the PDU. The payloads of the PDUs attached in association with the sequence numbers configure various kinds of data in the GATT connection.

[Operations]

FIG. 10 is a sequence diagram depicting an example of a flow of processing in the example of application of the embodiment of the present technology to the BLE.

In the GATT, communication is held by a server-client model. A side that provides functions is called a "GATT server" while a side that uses the functions is called a "GATT client." In this example, the output instrument A (101) is the GATT client, and the output instrument B (102) is the GATT server. The GATT server has a data structure of a combination of a profile, a service, and a characteristic. In GATT data communication, a handle (data position) of the data structure is designated and accessed.

As described above, after establishment of connection between two BLE devices by the GAP, the GATT data communication is started (Step S711). The GATT client needs to specify handles for individual pieces of definition data regarding the data structure of the GATT server. Reading of the data structure is divided into two stages, and association of a UUID with each handle is thereby acquired. In other words, first, a service used by the client is searched as the first stage, and next, definition information regarding the characteristic inherent in the service is searched as the second stage. In actual access to data regarding the characteristic, the GATT client accesses a predetermined position of the GATT server by using the handle in this read information.

The output instrument A (101) transmits the clock time measurement packet described above to the output instrument B (102) by a write request (Step S712). At that time, the output instrument A (101) creates a clock time measurement GATT database and manages the clock time measurement packet by an attribute. An API for reading/writing corresponds to data regarding GATTM_ATT_SET_VALUE_REQ.

The output instrument B (102) receives the clock time measurement packet and performs write processing (Step S723). In other words, the output instrument B (102) stores a clock time per processing of the output instrument B (102) in the received clock time measurement packet.

Subsequently, the output instrument B (102) transmits the clock time measurement packet to the output instrument A (101) (Step S724). In the GATT communication, functions include a Notification of transmitting a notification from the server to the client but not requesting a response and an Indication of transmitting a notification from the server to the client and requesting an acknowledgment response. Since the clock time measurement packet from the output instrument B (102) in this embodiment does not need a response, the Notification is used.

Further, the output instrument A (101) receives the clock time measurement packet (Step S715), obtains the processing delay and the transmission delay as described above from the clock times stored in the received clock time measurement packet, and generates the set value of the clock of the output instrument B (102). The output instrument A (101) then transmits the clock time setting packet to the output instrument B (102) by a write request (Step S716). At that time, the output instrument A (101) creates a clock time setting GATT database and manages the clock time setting packet by an attribute. An API for reading/writing corresponds to data regarding GATTM_ATT_SET_VALUE_REQ.

The output instrument B (102) receives the clock time setting packet and sets the clock of the output instrument B (102) according to this clock time setting packet (Step 3727).

It is noted that, in a case in which the instruments mutually transmit the packet, the instrument transmitting the packet later takes precedence. In a case of receiving the clock time measurement packet during processing on the clock time measurement packet, the instrument buries the clock time measurement packet with zeros and conveys a message indicating an overlap to the counterpart instrument. Upon receiving this message, the counterpart instrument retransmits the clock time measurement packet by shifting time by a random value. Further, the output instrument B (102) does not process the clock time setting packet in a case of receiving the clock time setting packet before the clock time measurement packet.

In such way, according to the embodiment of the present technology, it is possible to bring the output instruments 101 and 102 connected to each other via communication into synchronization with each other by collecting the clock time per processing and generating the clock time difference between the clocks. Particularly, even with the communication scheme such as the BLE for intermittent connection, the clock time difference can be generated with disconnection time present between connection times; thus, it is possible to bring the output instruments in synchronization with each other while flexibly coping with the change in the communication state.

While it is supposed in the embodiment described above that the output instruments are the audio instruments reproducing and outputting stereo audio, the present technology is not limited to this case, and the output instruments may, for example, be video instruments that reproduce and output stereo images. Further, the present technology is not limited to left and right stereo output and is applicable to ordinary synchronization processing between instruments.

It is noted that the embodiment illustrates an example for embodying the present technology and that a correspondence relation is established between each of the matters in the embodiment and each of invention specifying matters in the claims. Likewise, a correspondence relation is established between each of the invention specifying matters in the claims and each of matters denoted by the same name in the embodiment of the present technology. However, the present technology is not limited to the embodiment and can be embodied by making various modifications of the embodiment without departing from the spirit of the technology.

Moreover, processing procedures described in the above embodiment may be regarded as a method involving these series of procedures, may be regarded as a program for causing a computer to execute these series of procedures, or may be regarded as a recording medium that stores the program. For example, as this recording medium, a CD (Compact Disc), an MD (MiniDisc), a DVD (Digital Versatile Disc), a memory card, a Blu-ray (registered trademark) Disc, or the like can be used.

Furthermore, the advantages described in the present specification are given as an example only, and the advantages of the present technology are not limited to those described in the present specification and may contain other advantages.

It is noted that the present technology can also be configured as follows.

(1) A communication apparatus including:
a clock time management section that manages a clock time;
a clock time measurement section that measures a clock time of another clock time management section of another apparatus and a clock time of the clock time management section for every predetermined processing, in a course of communication with the other apparatus having the other clock time management section;
a clock time difference generation section that generates a clock time difference between the clock time of the other clock time management section and the clock time of the clock time management section on the basis of the measured clock times; and
a clock time correction instruction section that instructs the other apparatus to correct the clock time of the other clock time management section on the basis of the generated clock time difference.

(2) The communication apparatus according to (1), in which
the clock time measurement section transmits and receives a clock time measurement packet that stores the clock time of the other clock time management section and the clock time of the clock time management section acquired for every predetermined processing.

(3) The communication apparatus according to (1) or (2), in which
the clock time measurement section performs, as the predetermined processing, measuring of a clock time at which transmission to the other apparatus is performed and clock times at which transmission and reception by the other apparatus are performed.

(4) The communication apparatus according to any one of (1) to (3), in which
the clock time measurement section performs, as the predetermined processing, measuring of a clock time of processing that is performed before the transmission to the other apparatus is performed and a clock time of internal processing that is performed after reception by the other apparatus is performed.

(5) The communication apparatus according to any one of (1) to (4), in which
the clock time correction instruction section transmits, to the other apparatus, a clock time setting packet for setting the clock time of the other clock time management section to a designated clock time.

(6) The communication apparatus according to any one of (1) to (5), in which
the clock time correction instruction section sets, as delay time, time required for the processing that is performed before the transmission to the other apparatus is performed, the communication with the other apparatus, and the internal processing that is performed after the reception by the other apparatus is performed, and has a clock time obtained by reflecting the delay time in the clock time of the clock time management section set as the clock time of the other clock time management section.

(7) The communication apparatus according to any one of (1) to (6), further including:
an output section that performs predetermined output according to the clock time of the clock time management section.

(8) The communication apparatus according to any one of (1) to (7), in which
the communication is held by a communication scheme that permits intermittent connection.

(9) The communication apparatus according to (8), in which
the communication is held in compliance with a wireless communication standard Bluetooth (registered trademark) Low Energy,
the clock time measurement section transmits and receives a packet for measuring the clock time of the other clock time management section and the clock time of the clock time management section by GATT (Generic ATTribute profile) connection, and the clock time correction instruction section transmits a packet for giving an instruction on correction of the clock time of the other clock time management section by the GATT connection.

(10) A communication apparatus including:
a clock time management section that manages a clock time;
a clock time measurement section that measures a clock time of another clock time management section of another apparatus and a clock time of the clock time management section for every predetermined processing, in a course of communication with the other apparatus having the other clock time management section;
a clock time difference generation section that generates a clock time difference between the clock time of the other clock time management section and the clock time of the clock time management section on the basis of the measured clock times; and a clock time correction section that corrects the clock time of the clock time management section on the basis of the generated clock time difference.

(11) A communication system including:
first and second communication apparatuses each including a clock time management section that manages a clock time, in which
the first communication apparatus includes
a clock time measurement section that measures a clock time of the clock time management section of the second communication apparatus and a clock time of the clock time management section of the first communication apparatus for every predetermined processing, in a course of communication with the second communication apparatus,
a clock time difference generation section that generates a clock time difference between the clock time of the clock time management section of the second communication apparatus and the clock time of the clock time management section of the first communication apparatus on the basis of the measured clock times, and
a clock time correction instruction section that instructs the other apparatus to correct the clock time of the clock time management section of the second communication apparatus on the basis of the generated clock time difference, and
the second communication apparatus corrects the clock time of the clock time management section of the second communication apparatus according to the instruction from the clock time correction instruction section of the first communication apparatus.

REFERENCE SIGNS LIST

101, 102: Output instrument
110: RF (Radio Frequency) section
120: Communication section
130: Packet generation section
140: Packet analysis section
150: Clock
160: Clock information acquisition section
170: Clock information correction section
190: Output section
300: Operation instrument

The invention claimed is:

1. A communication apparatus comprising:
a clock time management section that manages a clock time;
a clock time measurement section that measures a clock time of another clock time management section of another apparatus and a clock time of the clock time management section at predetermined processing instances, in a course of communication with the other apparatus having the other clock time management section;
a clock time difference generation section that generates a clock time difference between the clock time of the other clock time management section and the clock time of the clock time management section on a basis of the measured clock times; and
a clock time correction instruction section that instructs the other apparatus to correct the clock time of the other clock time management section on a basis of the generated clock time difference, wherein
the clock time measurement section generates an initial clock time measurement packet that stores the clock time of the clock time management section and receives, from the other apparatus, updated clock time measurement packets that store the clock time of the other clock time management section and the clock time of the clock time management section acquired at each of the predetermined processing instances, and
the clock time correction instruction section transmits, to the other apparatus, clock time setting packets for setting the clock time of the other clock time management section to a designated clock time respectively based upon the updated clock time measurement packets acquired at each of the predetermined processing instances.

2. The communication apparatus according to claim 1, wherein
the clock time measurement section performs measuring of a clock time at which transmission to the other apparatus is performed and clock times at which transmission and reception by the other apparatus are performed.

3. The communication apparatus according to claim 1, wherein
the clock time measurement section performs measuring of a clock time of processing that is performed before transmission to the other apparatus is performed and a clock time of internal processing that is performed after reception by the other apparatus is performed.

4. The communication apparatus according to claim 1, wherein
the clock time correction instruction section sets, as delay time, time required for processing that is performed before transmission to the other apparatus is performed, the communication with the other apparatus, and internal processing that is performed after reception by the other apparatus is performed, and has a clock time obtained by reflecting the delay time in the clock time of the clock time management section set as the clock time of the other clock time management section.

5. The communication apparatus according to claim 1, further comprising:
an output section that performs predetermined output according to the clock time of the clock time management section.

6. The communication apparatus according to claim 1, wherein
the communication is held by a communication scheme that permits intermittent connection.

7. The communication apparatus according to claim 6, wherein
the communication is held in compliance with a wireless communication standard Bluetooth (registered trademark) Low Energy,
the clock time measurement section transmits and receives the initial clock time measurement packet and the updated clock time measurement packets by GATT (Generic ATTribute profile) connection, and
the clock time correction instruction section transmits the clock time setting packets by the GATT connection.

8. A communication apparatus comprising:
a memory storing program code, and
a processor configured to execute the program code to perform operations comprising:
managing a clock time;
measuring a clock time of the communication apparatus and a clock time another apparatus at predetermined processing instances, in a course of communication with the other apparatus;
generating a clock time difference between the clock time of the communication apparatus and the clock time of the other apparatus on a basis of the measured clock times; and
instructing the other apparatus to correct the clock time of the other apparatus on a basis of the generated clock time difference; and
transmitting an initial clock time measurement packet that stores the clock time of the communication apparatus to the other apparatus and receiving, from the other apparatus, updated clock time measurement packets that store the clock time of the other apparatus and the clock time of the communication apparatus acquired at each of the predetermined processing instances, wherein
instructing the other apparatus to correct the clock time comprises transmitting, to the other apparatus, clock time setting packets for setting the clock time of the other apparatus to a designated clock time respectively based upon the updated clock time measurement packets acquired at each of the predetermined processing instances.

9. The communication apparatus according to claim 8, wherein the operations further comprise:
performing measuring of a clock time at which transmission to the other apparatus is performed and clock times at which transmission and reception by the other apparatus are performed.

10. The communication apparatus according to claim 8, wherein the operations further comprise:
performing measuring of a clock time of processing that is performed before transmission to the other apparatus is performed and a clock time of internal processing that is performed after reception by the other apparatus is performed.

11. A non-transitory computer readable medium storing program for a communication apparatus, the program being executable by a processor to perform operations comprising:
managing a clock time;
measuring a clock time of the communication apparatus and a clock time another apparatus at predetermined processing instances, in a course of communication with the other apparatus;
generating a clock time difference between the clock time of the communication apparatus and the clock time of the other apparatus on a basis of the measured clock times; and
instructing the other apparatus to correct the clock time of the other apparatus on a basis of the generated clock time difference, and
transmitting an initial clock time measurement packet that stores the clock time of the communication apparatus to the other apparatus and receiving, from the other apparatus, updated clock time measurement packets that store the clock time of the other apparatus and the clock time of the communication apparatus acquired at each of the predetermined processing instances, wherein
instructing the other apparatus to correct the clock time comprises transmitting, to the other apparatus, clock time setting packets for setting the clock time of the other apparatus to a designated clock time respectively based upon the updated clock time measurement packets acquired at each of the predetermined processing instances.

12. The non-transitory computer readable medium according to claim 11, wherein the operations further comprise:
performing measuring of a clock time at which transmission to the other apparatus is performed and clock times at which transmission and reception by the other apparatus are performed.

13. The non-transitory computer readable medium according to claim 11, wherein the operations further comprise:
performing measuring of a clock time of processing that is performed before transmission to the other apparatus is performed and a clock time of internal processing that is performed after reception by the other apparatus is performed.

* * * * *